United States Patent
Schmid et al.

(10) Patent No.: US 7,872,060 B2
(45) Date of Patent: Jan. 18, 2011

(54) INKJET INK COMPOSITION

(75) Inventors: Christian Schmid, Rancho Bernardo, CA (US); George Sarkisian, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 982 days.

(21) Appl. No.: 11/387,642

(22) Filed: Mar. 23, 2006

(65) Prior Publication Data

US 2007/0225400 A1 Sep. 27, 2007

(51) Int. Cl.
*B32B 27/00* (2006.01)
*B32B 27/40* (2006.01)
*C08G 18/08* (2006.01)
*C08J 3/00* (2006.01)
*C08K 3/20* (2006.01)
*C08L 75/00* (2006.01)
*C09D 11/00* (2006.01)

(52) U.S. Cl. .................... 523/160; 428/423.1; 523/161; 524/591; 524/839; 524/840

(58) Field of Classification Search .............. 523/160, 523/161; 524/591, 839, 840; 428/423.1
See application file for complete search history.

(56) References Cited

U.S. PATENT DOCUMENTS

| | | | |
|---|---|---|---|
| 5,430,093 A | 7/1995 | Miyamoto et al. | |
| 5,640,187 A | 6/1997 | Kashiwazaki et al. | |
| 5,696,182 A | 12/1997 | Kashiwazaki et al. | |
| 5,889,083 A | 3/1999 | Zhu | |
| 5,965,196 A | 10/1999 | Sawada | |
| 6,136,890 A | 10/2000 | Carlson et al. | |
| 6,368,397 B1 | 4/2002 | Ichizawa et al. | |
| 6,406,606 B1 | 6/2002 | Betto et al. | |
| 6,451,103 B1 * | 9/2002 | Uemura et al. ............. 106/493 |
| 6,498,222 B1 * | 12/2002 | Kitamura et al. ......... 526/307.2 |
| 6,786,955 B2 | 9/2004 | Kabalnov | |
| H2113 H | 1/2005 | Nichols et al. | |
| 6,933,329 B1 | 8/2005 | Meyrick et al. | |
| 2002/0075369 A1 | 6/2002 | Ota et al. | |
| 2003/0055127 A1 | 3/2003 | Chen et al. | |
| 2003/0166742 A1 | 9/2003 | Hirasa et al. | |
| 2003/0184629 A1 | 10/2003 | Valentini et al. | |
| 2004/0085419 A1 | 5/2004 | Yau et al. | |
| 2004/0110865 A1 | 6/2004 | McCovick et al. | |
| 2004/0229976 A1 | 11/2004 | Kakiuchi et al. | |
| 2004/0242726 A1 | 12/2004 | Waki et al. | |
| 2005/0148688 A1 | 7/2005 | Mizutani et al. | |
| 2006/0258773 A1 * | 11/2006 | Schmid et al. ............. 523/160 |

FOREIGN PATENT DOCUMENTS

| | | |
|---|---|---|
| EP | 0 586 101 A1 | 3/1994 |
| EP | 0 801 119 A1 | 10/1997 |
| EP | 1564266 A1 | 8/2007 |
| WO | 0036030 | 6/2000 |

OTHER PUBLICATIONS

SASOL Material Safety Data Sheet for Cosmacol AES-7002024 NE, Jan. 10, 2000, Supplied by the applicant in their response of Jun. 26, 2009.*
US Statutory Invention Registration No. US H2113H, published Jan. 4, 2005.
International Search Report for International Application No. PCT/US2007/064531, dated Oct. 24, 2007.

* cited by examiner

*Primary Examiner*—Patrick D Niland

(57) ABSTRACT

An inkjet ink composition includes a polyurethane material having a weight-average molecular weight ranging from about 50,000 to about 500,000. The polyurethane material is present in an effective amount ranging from about 0.2 wt. % to about 5 wt. %. The composition also includes a solvent present in an effective amount ranging from about 5 wt. % to about 20 wt. %, and an anionic surfactant present in an effective amount ranging from about 0.01 wt. % to about 3 wt. %. The inkjet ink composition is adapted to exhibit enhanced decap.

19 Claims, No Drawings

INKJET INK COMPOSITION

BACKGROUND

The present disclosure relates generally to inkjet ink compositions.

Formulating inkjet inks that are capable of forming a durable film (e.g., exhibits a reduction in highlighter smear and/or dry rub) that also exhibits good reliability and good nozzle health has been difficult. This may be due, at least in part, to the fact that the high molecular weight and/or hydrophobic nature of the binders used for achieving good highlighter smear may make it difficult for the binders to be ejected from an inkjet print head. High molecular weight polymers may contribute to the viscosity build-up of inks in uncapped nozzles. Hydrophobic binders may precipitate out of solution and deposit on resistors of print heads. Both effects may, in some instances, degrade drop ejection. Hydrophilic, low molecular weight binders that may be capable of achieving superior reliability generally offer minimal improvement in highlighter smear and smudge resistance.

As such, it would be desirable to provide an inkjet ink composition that substantially simultaneously exhibits enhanced pen reliability and enhanced highlighter smear durability, as well as high optical density, acceptable drytime, and combinations thereof.

SUMMARY

An inkjet ink composition is disclosed. The composition includes a polyurethane material having a weight-average molecular weight ranging from about 50,000 to about 500,000. The polyurethane material is present in an effective amount ranging from about 0.2 wt. % to about 5 wt. %. The composition also includes a solvent present in an effective amount ranging from about 5 wt. % to about 20 wt. %, and an anionic surfactant present in an effective amount ranging from about 0.01 wt. % to about 3 wt. %. The inkjet ink composition is adapted to exhibit enhanced decap.

DETAILED DESCRIPTION

Embodiments of the inkjet ink composition incorporate high molecular weight polyurethanes to decrease drytime and to enhance resistance to highlighter smear and wet smudge on paper, substantially without compromising the pen reliability or optical density. In an embodiment, the ink composition provides a finger drytime of less than about 10 seconds, and highlighter smear and wet smudge less than about 50 mOD on plain paper. In this embodiment, the ink composition provides black optical density greater than about 1.35.

The ink compositions disclosed herein are also capable of enhanced decap performance, good print durability, good nozzle health, and pen reliability. The term "decap," as referred to herein, means the ability of the inkjet ink to readily eject from the print head, upon prolonged exposure to air. The ink decap time is measured as the amount of time that an ink printhead may be left uncapped before the printer nozzles no longer fire properly, potentially because of clogging or plugging. Generally, the nozzle(s) may become clogged/plugged by a viscous plug that forms in the nozzle(s) as a result of water loss, crusting of the ink, and/or crystallization of the dye in and/or around any of the nozzles. If a nozzle has plugged, ink droplets ejected through the nozzle's orifice may be misdirected, which may adversely affect print quality. The orifice may also become completely blocked, and as a result the ink droplets may not pass through the affected nozzle.

Inkjet ink decap times are typically measured over short and long time periods. The short-time decap generally determines how long the printhead can be uncapped before drop quality degrades below the quality obtained with a freshly uncapped print head. Various print/image defects may result from this drop quality degradation due to decap. To counteract decap effects, the printer service routine requires the idle nozzles to spit on a regular basis into the waste container (spittoon) to avoid printing defects. In order to achieve good print image quality, while maintaining or improving throughput and saving ink, it is desirable to keep the short-time decap as long as possible, and to use as few spits as possible to refresh the nozzles. On the other hand, long-time decap determines how long a printhead can be stored in an uncapped state, before nozzles are no longer readily recoverable by the printer's servicing routines. In particular, it determines attributes of the printhead, such as, for example, the storage stability. Long-time decap is desirable for inks so that nozzles are able to be left uncapped and unused for extended periods of time, while the printheads can still be revived by servicing.

Without being bound to any theory, it is believed that embodiments of the ink composition have good decap performance, at least in part, because of the combination of water-soluble solvent/solvent mixtures and anionic surfactant(s). It is further believed that the solvent(s) minimize the viscosity build-up of polyurethane in solution, and that the anionic surfactant(s) assist in driving polyurethane out of the nozzle region and back into the bulk ink as water evaporates.

Embodiments of the inkjet ink composition generally include a polyurethane material, a solvent, and an anionic surfactant. It is to be understood that all of the materials of the ink composition are present in effective amounts so that the combination achieves at least one of the following characteristics when printed: enhanced optical density, decreased drytime, enhanced highlighter smear durability, enhanced wet smudge durability, and/or combinations thereof. It is to be further understood that the materials of the ink composition are present in effective amounts to enhance the decap performance.

In an embodiment, the polyurethane material has a weight-average molecular weight ranging from about 50,000 to about 500,000. In an embodiment, the polyurethane has an acid value ranging from about 10 mg KOH/g polymer to about 150 mg KOH/g polymer. In another embodiment, the polyurethane has an acid value ranging from about 50 mg KOH/g polymer to about 70 mg KOH/g polymer. The polyurethane material is present in an effective amount ranging from about 0.2 wt. % to about 5 wt. %. It is believed that the characteristics of the polyurethanes described herein, over a wide molecular weight range (e.g., from about 10,000 to about 500,000), contribute to the ink composition's decreased drytime. Furthermore, it is believed that the high molecular weight nature of the polyurethanes described herein contributes to the ink composition's superior durability.

The solvent may be a single solvent or a combination of two or more solvents. Generally, the solvent(s) is/are present in an effective amount ranging from about 5 wt. % to about 20 wt. %. In a non-limitative example, the effective amount ranges from about 5 wt. % to about 15 wt. %. Non-limitative examples of solvents suitable for the inkjet ink composition include 1,3-bis(2-hydroxyethyl)-5,5-dimethylhydantoin; low molecular weight (e.g., Mn=266) glycerol propoxylate; 2-hydroxyethyl-2-imidazolidinone (i.e., 2-hydroxyethyl-2-imidazolidone); 2-hydroxyethyl-2-pyrrolidone (i.e., 2-hydroxyethyl-2-pyrrolidinone); 1,2,6-hexanetriol; D-sorbitol; 1,4-bis(2-hydroxyethyl)-piperazine; 3-(N-morpholino)-1,2-propanediol; low molecular weight glyceryl polyoxyethyl ether; low molecular weight (e.g., Mn=300) polyethylene glycol; tetraethyleneglycol; and/or combinations thereof.

The anionic surfactant is present in the ink composition in an effective amount ranging from about 0.01 wt. % to about 3 wt. %. A first class (referred to herein as "class 1") of suitable anionic surfactants includes, but is not limited to alkyl sulfates having a carbon chain with eight to sixteen carbon atoms (non-limitative examples of which include sodium laureth sulfate and sodium lauryl sulfate), dodecylbenzenesulfonate, N-lauroyl sarcosinate, poly(oxy-1,2-ethanediyl), and combinations thereof. A second class (referred to herein as "class 2") of suitable anionic surfactants includes, but is not limited to phosphate ester surfactants, each of which has one of the following general structures:

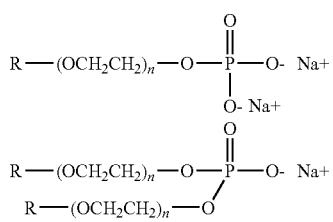

where R=a hydrophobic moiety (e.g., oleyl, nonylphenyl, etc.) and n=integers from 1-20. As depicted in the structures, the phosphate ester surfactants have either a single hydrophobic tail/moiety (non-limitative examples of which include polyethylene glycol oleyl mono/di-ester phosphates (one of which is commercially available under the tradename Crodafos N10A from Croda, Inc. located in Edison, N.J.) and polyethylene glycol mono(octyl phenyl) phosphate, or the like); or multiple hydrophobic tails/moieties (e.g., nonylphenol ethoxylated branched phosphates (a non-limitative example of which is nonylphenol ethoxylate phosphate ester which is commercially available under the tradename Phospholan 9NP from Akzo Nobel Chemical, located in Arnhem, Netherlands)). Still another non-limitative example of a suitable phosphate ester surfactant (class 2) is PPG-5-Ceteth-10 phosphate (a non-limitative example of which is commercially available under the tradename Crodafos SG from Croda, Inc.). It is to be understood that salts of the previously listed anionic surfactants may also be suitable for use in the ink composition.

Embodiments of the ink composition may also include colorants, water, anionic binders (non-limitative examples of which include acrylic binders, styrene acrylic binders, and/or the like, and/or combinations thereof), and/or any other suitable additives. In an embodiment, the colorant is a pigment(s) and/or dye(s) present in an effective amount ranging from about 0.1 wt. % to about 6 wt. %. Generally, the water makes up a balance of the ink composition.

It is to be understood that the pH of the ink composition may be varied as desired. In an embodiment, the pH of the ink ranges from about 7 to about 10.

It is to be understood that various types of additives may be employed in the ink composition to optimize the properties of the ink composition for specific applications. For example, biocides may be used in an embodiment of the ink composition to inhibit growth of microorganisms. One suitable non-limitative example of a biocide is 1,2-benzisothiazolin-3-one (BIT). Sequestering agents such as EDTA may be included to substantially eliminate potential deleterious effects of heavy metal impurities (if any). Buffer solutions may be used to control the pH of the ink composition, as desired and/or necessitated by a particular end use.

In an embodiment of an inkjet system, an embodiment of the inkjet ink composition is established on at least a portion of a suitable substrate. It is to be understood that any substrate may be selected that is suitable for having indicia (e.g. alphanumeric indicia and/or graphical indicia) printed thereon. In an embodiment, the substrate is paper (non-limitative examples of which include plain copy paper or papers having recycled fibers therein) or photopaper (non-limitative examples of which include polyethylene or polypropylene extruded on one or both sides of paper), and/or combinations thereof. In an embodiment, the substrate has a thickness along substantially the entire length ranging between about 0.025 mm and about 0.5 mm.

The inkjet ink composition may be established on the substrate via any suitable inkjet printing technique. Non-limitative examples of such inkjet printing techniques include thermal, acoustic, and piezoelectric inkjet printing.

In an embodiment, a fixer fluid may be established on the substrate prior to the establishment of the inkjet ink composition. Without being bound to any theory, it is believed that the fixer fluid advantageously aids in achieving good print quality by holding colorants and binders on the substrate surface. Suitable fixer fluid ingredients include, but are not limited to acids (non-limitative examples of which include organic acids), salts (non-limitative examples of which include bi- or tri-valent metal salts), cationic polymers (non-limitative examples of which include polymers with quaternary ammonium salts), and/or combinations thereof.

To further illustrate embodiment(s) of the present disclosure, various examples are given herein. It is to be understood that these examples are provided for illustrative purposes and are not to be construed as limiting the scope of the disclosed embodiment(s).

EXAMPLES

One set of inks was formulated using a variety of different solvents (shown in Table 1). Each ink included about 8 wt. % of the selected solvent, about 0.7 wt. % of Surfynol® SEF (a nonionic surfactant commercially available from Air Products and Chemicals, Inc. located in Allentown, Pa.), about 0.5 wt. % Crodafos® N3 (an anionic surfactant commercially available from Croda, Inc. located in Edison, N.J.), about 0.1 wt. % Zonyl® FSO (a nonionic fluorosurfactant commercially available from Dupont located in Wilmington, Del.), about 0.1 wt. % of Proxel® GXL (a biocide commercially available from Arch Chemicals Inc. located in Norwalk, Conn.), about 2 wt. % of a polyurethane having a molecular weight of about 180,000, and a 0.1 wt. % of a pigment.

TABLE 1

Decap results for Inks with Different Solvents

| Ink # | Solvent | Decap Score |
|---|---|---|
| 1 | 1,4-bis(2-hydroxyethyl)-piperazine | 11 |
| 2 | 1,2,6-hexanetriol | 15 |
| 3 | D-sorbitol | 20 |
| 4 | 1,3-bis(2-hydroxyethyl)-5,5-dimethylhydantoin | 23 |
| 5 | 2-hydroxyethyl-2-imidazolidinone | 35 |
| 6 | 3-(N-morpholino)-1,2-propanediol | 43 |
| 7 | glycerol propoxylate (MW = 266) | 50 |
| 8 | glyceryl polyoxyethyl ether | 70 |
| 9 | Polyethylene glycol (MW = 300) | 87 |
| 10 | 2-hydroxyethyl-2-pyrrolidone | 136 |
| 11 | glycerol propoxylate (MW = 1000) | 153 |

TABLE 1-continued

Decap results for Inks with Different Solvents

| Ink # | Solvent | Decap Score |
|---|---|---|
| 12 | glycerol propoxylate (MW = 720) | 169 |
| 13 | Triethyleneglycol | 186 |

It is to be understood that the "decap score" in Table 1 refers to the number of spits that will refresh uncapped nozzles, such that their firing characteristics substantially match their initial, out-of-cap performance. The test was performed for various durations out of cap, including 2 seconds, 6 seconds, 14 seconds, and 1 minute. The scores recorded in Table 1 are a summation of spits in the various tests. It is to be understood that inks having lower decap scores had better decap performance than those inks having higher scores.

Another set of inks was formed using a variety of different surfactants (shown in Table 2). Each ink included about 8 wt. % of a solvent (either Dantocol® DHE or 1,2,6-hexanetriol), about 0.7 wt. % of Surfynol® SEF, about 0.5 wt. % of the selected anionic surfactant, about 0.1 wt. % Zonyl® FSO, about 0.1 wt. % of Proxel® GXL, about 2 wt. % of a polyurethane having a molecular weight of about 180,000, and a 0.1 wt. % of a pigment.

TABLE 2

Decap results for Inks with Different Surfactants

| Ink # | Surfactant | Class # | Net Decap Score with Dantocol | Net Decap Score with 1,2,6-Hexanetriol | Net Decap Score |
|---|---|---|---|---|---|
| A | polyethylene glycol oleyl ether phosphate | 2 | 11 | 7 | 18 |
| B | nonylphenol, ethoxylated, branched phosphate | 2 | 10 | 8 | 18 |
| C | polyethylene glycol mono(octyl phenyl) ether phosphate | 2 | 10 | 9 | 19 |
| D | sodium lauryl sulfate | 1 | 14 | 8 | 22 |
| E | sodium laureth sulfate | 1 | 14 | 9 | 23 |
| F | sodium lauryl sulfate | 1 | 13 | 11 | 24 |
| G | phosphated alkyl ethoxylate | 2 | 20 | 15 | 35 |
| H | N-octyl betaine | X | 55 | 54 | 109 |
| I | organo-phosphate amphoteric | X | 48 | 64 | 112 |
| J | nonylphenol, ethoxylated, branched phosphate | 2 | 10 | No Data | 10 |
| K | aryl alkoxy phosphate | X | 79 | No Data | 79 |

It is to be understood that the "net decap score" in Table 2 refers to the number of spits used to refresh uncapped nozzles, such that their firing characteristics substantially match their initial, out-of-cap performance. The test was performed for various durations out of cap, including 2 seconds, 6 seconds, 14 seconds, and 1 minute. The scores recorded in Table 2 are a summation of spits in the various tests. It is to be understood that inks having lower decap scores had better decap performance than those inks having higher scores. Generally, the surfactants of classes 1 and 2 (both of which are defined hereinabove) appear to lead to superior decap performance. Surfactants not falling into one of classes 1 and 2 are denoted by 'X' in Table 2.

Still another set of inks was formulated with different anionic binders (shown in Table 3). Each ink included about 9% of 1,2,6-hexanetriol, about 0.7% Surfynol® SEF, about 0.5% Crodafos® N3, about 0.1% Zonyl® FSO, and about 3% of a self-dispersed black pigment.

TABLE 3

Optical Density, Highlighter Smear, and Decap for Inks with Different Anionic Binders

| Binder in Ink | Black Optical Density (KOD) | 1 Pass Smear (mOD) | 2 Pass Smear (mOD) | Net Decap Score |
|---|---|---|---|---|
| 1.5% PU-A (Mw = 180,000) | 1.39 | 23 | 120 | 5 |
| 1.5% PU-B (Mw = 25,000) | 1.39 | 80 | 195 | 5 |
| None | 1.31 | 115 | 215 | 17 |
| 1.5 Joncryl 586 | 1.38 | 120 | 238 | 5 |

The first ink, formulated with high molecular weight polyurethane (PU-A), delivered superior highlighter smear performance, while still giving equivalent or better decap performance, when compared to the second ink (formulated with low molecular weight polyurethane (PU-B)), the third ink (with no extra binder), and the fourth ink (with Joncryl® 586, a low molecular weight styrene acrylic resin).

The black optical density data and smear data in Table 3 are averaged over four types of common office plain papers. The "1-pass smear" readings represent the transfer of ink to an unprinted area of the paper as a result of a common office highlighter marker being smeared across a printed area once. The "2-pass smear" is the analogous transfer of ink to an unprinted area caused by passing a common highlighter over print samples twice, in fairly rapid succession. It is to be understood that greater smear values represent worse durability.

It is to be understood that the "net decap score" in Table 3 refers to the number of spits used to refresh uncapped nozzles, such that their firing characteristics substantially match their initial, out-of-cap performance. The test was performed for various durations out of cap, including 2 seconds, 6 seconds, 14 seconds, and 1 minute. The scores recorded in Table 3 are a summation of spits in the various tests. It is to be understood that inks having lower decap scores had better decap performance than those inks having higher scores.

Embodiments of the ink composition and system advantageously incorporate high molecular weight polyurethanes for enhanced durability, while also incorporating specific solvent and surfactant combinations for enhanced operability.

While several embodiments have been described in detail, it will be apparent to those skilled in the art that the disclosed embodiments may be modified. Therefore, the foregoing description is to be considered exemplary rather than limiting.

What is claimed is:

1. An inkjet ink composition, comprising:
a polyurethane material having a weight-average molecular weight ranging from about 50,000 to about 500,000, the polyurethane material present in an effective amount ranging from about 0.2 wt. % to about 5 wt. % of the ink composition;
a solvent present in an effective amount ranging from about 5 wt. % to about 20 wt. % of the ink composition;
an anionic surfactant present in an effective amount ranging from about 0.01 wt. % to about 3 wt. % of the ink composition, the anionic surfactant being selected from a phosphate ester surfactant having one of the following structures:

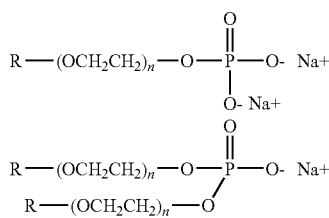

wherein R is a hydrophobic moiety, and n is an integer ranging from 1 to 20; and
a balance of the ink composition being water.

2. The inkjet ink composition as defined in claim 1 wherein the solvent comprises a co-solvent selected from 1,3-bis(2-hydroxyethyl)-5,5-dimethylhydantoin; glycerol propoxylate having a number average molecular weight of 266; 2-hydroxyethyl-2-imidizolidinone; 2-hydroxyethyl-2-pyrrolidone; 1,2,6-hexanetriol; D-sorbitol; 1,4-bis(2-hydroxyethyl)-piperazine; 3-(N-morpholino)-1,2-propanediol; glyceryl polyoxyethyl ether; polyethylene glycol having a number average molecular weight of 300; tetraethyleneglycol; and combinations thereof.

3. The inkjet ink composition as defined in claim 1 wherein the phosphate ester surfactant is combined with an other anionic surfactant selected from the group consisting of at least one alkyl sulfate having a carbon chain with eight to sixteen carbon atoms, N-lauroyl sarcosinate, sodium laureth sulphate, and sodium lauryl sulphate.

4. The inkjet ink composition as defined in claim 1, further comprising a colorant present in an effective amount ranging from about 0.1 wt. % to about 6 wt. % of the ink composition.

5. The inkjet ink composition as defined in claim 1 wherein the polyurethane material has an acid value ranging from about 10 mg KOH/g polymer to about 150 mg KOH/g polymer.

6. The inkjet ink composition as defined in claim 1, further comprising anionic binders.

7. A method for forming an inkjet ink composition, comprising:

combining a polyurethane having a weight-average molecular weight ranging from about 50,000 to about 500,000 and present in an amount ranging from about 0.2 wt. % to about 5 wt. % of the ink composition with a solvent present in an amount ranging from about 5 wt. % to about 20 wt. % of the ink composition;

mixing an anionic surfactant present in an amount ranging from about 0.01 wt. % to about 3 wt. % of the ink composition with the polyurethane and solvent combination, the anionic surfactant being selected from a phosphate ester surfactant having one of the following structures:

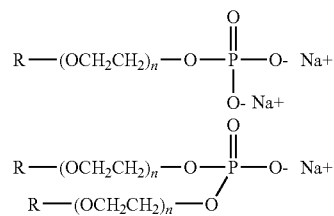

wherein R is a hydrophobic moiety, and n is an integer ranging from 1 to 20; and
adding water as a balance of the ink composition to the mixture.

8. The method as defined in claim 7, further comprising adding a colorant to the mixture, the colorant being present in an amount ranging from about 0.1 wt. % to about 6 wt. % of the ink composition.

9. The method as defined in claim 7 wherein the solvent further comprises a co-solvent selected from 1,3-bis(2-hydroxyethyl)-5,5-dimethylhydantoin; glycerol propoxylate having a number average molecular weight of 266; 2-hydroxyethyl-2-imidizolidinone; 2-hydroxyethyl-2-pyrrolidone; 1,2,6-hexanetriol; 1,4-bis(2-hydroxyethyl)-piperazine; 3-(N-morpholino)-1,2-propanediol; glyceryl polyoxyethyl ether; polyethylene glycol having a number average molecular weight of 300; tetraethyleneglycol; and combinations thereof.

10. The method as defined in claim 7 wherein the phosphate ester surfactant is combined with an other anionic surfactant selected from the group consisting of at least one alkyl sulfate having a carbon chain with eight to sixteen carbon atoms, N-lauroyl sarcosinate, sodium laureth sulphate, and sodium lauryl sulphate.

11. An inkjet ink system, comprising:
a substrate; and
an inkjet ink composition established on at least a portion of the substrate, the inkjet ink composition including:
a polyurethane material having a weight-average molecular weight ranging from about 50,000 to about 500,000, the polyurethane material present in an effective amount ranging from about 0.2 wt. % to about 5 wt. % of the ink composition;
a solvent present in an effective amount ranging from about 5 wt. % to about 20 wt. % of the ink composition;
an anionic surfactant present in an effective amount ranging from about 0.01 wt. % to about 3 wt. % of the ink composition, the anionic surfactant being selected from a phosphate ester surfactant having one of the following structures:

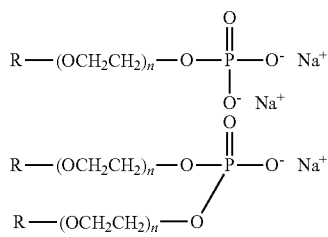

wherein R is a hydrophobic moiety, and n is an integer ranging from 1 to 20; and a balance of the ink composition being water.

12. The inkjet ink system as defined in claim 11 wherein a fixer fluid is established between the substrate and the ink composition.

13. The ink system as defined in claim 12 wherein the fixer fluid is selected from a salt, an acid, a cationic polymer, and combinations thereof.

14. The ink system as defined in claim 11 wherein the substrate is selected from plain paper and photopaper.

15. The ink system as defined in claim 11 wherein the solvent includes comprises a co-solvent selected from 1,3-bis(2-hydroxyethyl)-5,5-dimethylhydantoin; glycerol propoxylate having a number average molecular weight of 266; 2-hydroxyethyl-2-imidizoldinone; 2-hydroxyethyl-2-pyrrolidone; 1,2,6-hexanetriol; D-sorbitol; 1,4-bis(2-hydroxyethyl)-piperazine; 3-(N-morpholino)-1,2-propanediol; glyceryl polyoxyethyl ether; polyethylene glycol having a number average molecular weight of 300; tetraethyleneglycol; and combinations thereof.

16. The inkjet ink system as defined in claim 11 wherein the phosphate ester surfactant is combined with an other anionic surfactant selected from the group consisting of at least one alkyl sulfate having a carbon chain with eight to sixteen carbon atoms, N-lauroyl sarcosinate, sodium laureth sulphate, and sodium lauryl sulphate.

17. The inkjet ink composition as defined in claim 1 wherein the solvent is 1,3-bis(2-hydroxyethyl)-5,5-dimethylhydantoin.

18. The method as defined in claim 7 wherein the solvent is 1,3-bis(2-hydroxyethyl)-5,5-dimethylhydantoin.

19. The inkjet ink system as defined in claim 11 wherein the solvent is 1,3-bis(2-hydroxyethyl)-5,5-dimethylhydantoin.

* * * * *

UNITED STATES PATENT AND TRADEMARK OFFICE
CERTIFICATE OF CORRECTION

PATENT NO. : 7,872,060 B2  
APPLICATION NO. : 11/387642  
DATED : January 18, 2011  
INVENTOR(S) : Christian Schmid et al.

Page 1 of 1

It is certified that error appears in the above-identified patent and that said Letters Patent is hereby corrected as shown below:

In column 7, line 45, in Claim 2, delete "imidizolidinone" and insert -- imidazolidinone --, therefor.

In column 8, line 38, in Claim 9, delete "imidizolidinone" and insert -- imidazolidinone --, therefor.

In column 10, line 2, in Claim 15, after "solvent" delete "includes".

In column 10, line 5, in Claim 15, delete "imidizoldinone" and insert -- imidazolidinone --, therefor.

Signed and Sealed this  
Thirteenth Day of December, 2011

David J. Kappos  
*Director of the United States Patent and Trademark Office*